United States Patent [19]

Patrick et al.

[11] Patent Number: 5,784,454
[45] Date of Patent: Jul. 21, 1998

[54] ARRANGEMENT FOR COMMUNICATION WITH A SUBSCRIBER

[75] Inventors: Peter Patrick, Nürnberg; Hans-Wilhelm Rühl, Röthenbach/Pegnitz; Stefan Dobler, Neukirchen am Brand, all of Germany

[73] Assignee: U.S. Philips Corporation, New York, N.Y.

[21] Appl. No.: 508,285

[22] Filed: Jul. 27, 1995

[30] Foreign Application Priority Data

Jul. 30, 1994 [DE] Germany .................. 44 27 124.7

[51] Int. Cl.$^6$ .................................................. H04M 9/00
[52] U.S. Cl. .......................... 379/406; 379/51; 379/89; 379/407; 379/410; 704/231
[58] Field of Search .................. 379/406, 407, 379/410, 411, 412, 52, 51; 370/32.1; 375/348, 233, 346; 395/2.42; 704/226, 231

[56] References Cited

U.S. PATENT DOCUMENTS

| 4,914,692 | 4/1990 | Hartwell et al. | 379/410 |
| 5,247,512 | 9/1993 | Sugaya | 379/410 |
| 5,263,020 | 11/1993 | Yatsuzuka | 379/406 |
| 5,353,310 | 10/1994 | Russell et al. | 375/348 |
| 5,463,661 | 10/1995 | Moran, III et al. | 370/32.1 |

OTHER PUBLICATIONS

"Verfahren fur Friesprechen, Spracherkennung und Sprachcodierung in der SPS51", by W. Armbruster et al, PKI Tech. Mitt., Jan. 1990, pp. 35-41.

Primary Examiner—Ahmad F. Matar
Assistant Examiner—Jacques M. Saint-Surin
Attorney, Agent, or Firm—Dicran Halajian

[57] ABSTRACT

The invention relates to an arrangement for communication with a subscriber. The arrangement includes a spectral analysis unit for producing short-time spectral values (Y(i)) of received signals (E) which signals are at times subscriber's speech signals superimposed by echoes of transmission signals (S) transmitted to the subscriber, a echo cancelling unit for estimating short-time spectral values of the echoes ($X_w(i)$) and for producing difference values (D(i)) between the short-time spectral values (Y(i)) of the received signals (E) and the estimated short-time spectral values ($X_w(i)$) of the echoes, and speech recognition unit for evaluating the difference values (D(i)).

9 Claims, 2 Drawing Sheets

ARRANGEMENT FOR COMMUNICATION WITH A SUBSCRIBER

BACKGROUND OF THE INVENTION

The invention relates to an arrangement for communication with a subscriber.

U.S. Pat. No. 4,914,692 has disclosed an arrangement for communication with a subscriber, which arrangement is coupled to a telephone network via an interface. The communication with a subscriber is held via the telephone network. The arrangement comprises a prompting unit, a speech recognition sub-system, an echo canceller and a computer for controlling the communication arrangement. Using the speech recognition sub-system the communication arrangement recognizes speech signals from a calling subscriber and automatically generates prompts (transmission signals for the subscriber) by the prompting unit in dependence on this subscriber's speech signals. The prompts are transmitted to the subscriber via the telephone network. As a result, echoes of the prompts arise from the reflection on the communication path and the echoes are thus superimposed on the subscriber's speech signals. The interference of the subscriber's speech signals which is caused by prompt echoes is reduced by an echo canceller which is set, so that the speech recognition sub-system can identify the subscriber's speech signals in a substantially undisturbed manner in a predefined period of time between the transmission of a prompt and a response from the subscriber. Without echo cancellation there is no certainty about a correct subscriber's speech signal recognition for the cases where subscriber's speech signals and prompts occur simultaneously.

SUMMARY OF THE INVENTION

It is an object of the present invention to improve the communication arrangement with little technical means.

The object is achieved in that the arrangement includes spectral analysis means for producing short-time spectral values of received signals which signals are at times subscriber's speech signals superimposed by echoes of transmission signals transmitted to the subscriber, echo cancelling means for estimating short-time spectral values of the echoes and for producing difference values between the short-time spectral values of the received signals and the estimated short-time spectral values of the echoes, and speech recognition means for evaluating the difference values.

Such an arrangement guarantees that the speech recognition means recognize correctly the subscriber's speech signals even if the subscriber's speech signals and the signals transmitted to the subscriber occur simultaneously (full duplex operation). The setting of the echo cancelling means is adapted to the echoes only once for one of the time slots in which the transmitted signals and the received signals are subdivided for producing short-time spectral values. The cost of computation for the short-time spectral analyses is small compared with the cost of computation for a filtering in the time domain in that a FFT (Fast Fourier Transform) is used. The cost of computation already reduced in this manner, compared with realisations of the echo cancelling means in the time domain, for which the echo cancelling means are to be adapted for each sample value of the send and received signals, is further reduced in that both the echo cancellation and the speech recognition are carried out in the spectral domain, so that retransformations in the time domain become redundant.

In an embodiment of the invention, the echo cancelling means are provided for producing short-time spectral values of the transmission signals and for adaptively weighting these short-time spectral values to estimate the echoes, while especially an LMS algorithm is used for adaptively weighting the short-time spectral values of the transmission signals.

In this manner there is obtained an effective estimate of the short-time spectral values of the echoes, which short-time spectral values are derived from the short-time spectral values of the send signals. The weighting of the short-time spectral values of the send signals is adapted in such a way by the LMS algorithm (Least Mean Square), that the disturbing effect of the echoes is diminished sufficiently fast so that a correct speech recognition becomes possible.

For a further embodiment of the invention there is provided that generating means for generating the send signals are integrated with the arrangement.

The arrangement can be realised in this embodiment as an autonomous unit which establishes an automatic communication with the subscriber via the send and received signals. In contrast, it is also possible to have an external send signal production. In such a case the send signals are applied to the arrangement from the exterior.

In an advantageous manner, speech announcements are used as transmission signals.

Thus, the described communication arrangement is suitable for applications in which a dialogue between the subscriber and the communication arrangement is necessary. Also in the cases where the subscriber sends speech signals to the communication arrangement during the speech announcements, the recognition of these speech signals is ensured by the speech recognition sub-system. The communication arrangement may be used, for example, by travelling agencies for automatic travel booking.

A further possibility for embodying the invention lies in the establishment of a communication path between the arrangement and the subscriber by a telephone network.

In this case a subscriber line of the telephone network is assigned to the communication arrangement.

For a further embodiment of the invention, the arrangement for communication with the subscriber is installed inside a motor vehicle. For this purpose, it is specifically integrated into a car radio.

In this case there is an exchange of send signals from the communication arrangement, and subscriber's speech signals on the acoustic path inside the motor car. When the communication arrangement is integrated with a car radio, it is particularly possible to control by speech signals the car radio even when the radio plays, for example, when music is reproduced.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Figure 1:
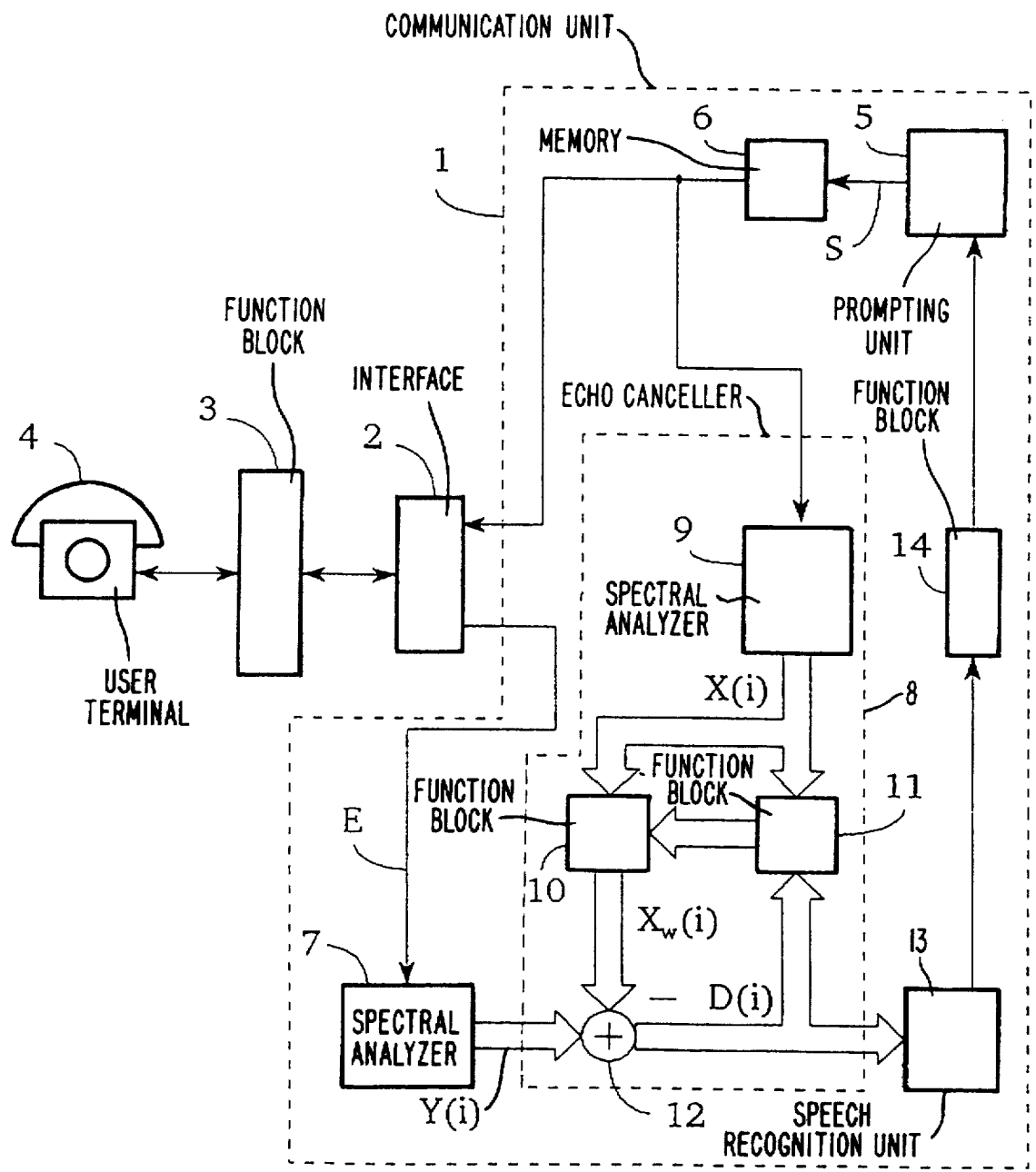
FIG. 1 shows a communication arrangement comprising an echo canceller for communication with a subscriber.

FIG. 1 represents a communication arrangement 1 which is coupled via an interface 2 and a function block 3 to a user terminal 4 of a subscriber. The function block 3 establishes a communication path between the communication arrangement 1 and the user terminal 4 of the subscriber. In the present exemplary embodiment the function block 3 represents a telephone network. The user terminal 4 is an analog or digital telephone set.

In the following the structure of the communication arrangement 1 will be further described. It comprises a prompting unit 5 which is used for generating send signals S such as prompts, which are sent after buffering in a buffer memory 6, via the interface 2 to the subscriber who has the user terminal 4, to transmit information to that subscriber. Also different signals such as, for example, signal tones may be used as send signals S. The communication arrangement 1 further comprises spectral analysis means 7 whose input is coupled to the interface 2. The spectral analysis means 7 are in the present case realised by a filter bank such as described, for example, in "PKI Technische Mitteilungen 11/1990, pp. 35 to 41". The spectral analysis means 7 are used for a short-time spectral analysis of received signals E, which are formed, on the one hand, by subscriber's speech signals generated by the subscriber and, on the other hand, occasionally also by echoes of the send signals S of the prompting unit 5. The subscriber's speech signals and the echoes are superimposed on the received signals E of the spectral analysis means 7. The unwanted echoes which disturb the subscriber's speech signals are caused by the fact that the send signals S are not only transmitted in the direction of the subscriber having the user terminal 4, but are also reflected in the direction of the spectral analysis means 7. The reflection of the send signals S may be caused by the interface 2, the function block 3 and also by the user terminal 4.

For cancelling the echoes, the communication arrangement 1 comprises an echo canceller 8 which includes, on the input side, spectral analysis means 9. The spectral analysis means 9 perform a short-time spectral analysis of the send signal sampling values buffered in the buffer memory 6. The spectral values produced by the spectral analysis means 9 may be considered components of a spectral vector $X(i)$ in the present case. Analogously, the spectral values produced by the spectral analysis means 7 are components of a spectral vector $Y(i)$. i denotes a time index and continuously numbers the time slots into which the signals applied to the spectral analysis means 7 and 9 are subdivided for short-time spectral analysis.

The spectral vector $X(i)$ is applied to a function block 10 which performs a weighting of the components of $X(i)$. A function block 11 is used for adapting this weighting. For this purpose both the spectral vector $X(i)$ and a difference spectral vector $D(i)$ are evaluated by the function block 11. The difference spectral vector $D(i)$ is generated by a subtracter means 12 which subtracts from the components of the spectral vector $Y(i)$ the particular components of the vector $X_w(i)$ whose components are equal to the weighted components of the spectral vector $X(i)$. The components of the difference spectral vector $D(i)$ are thus difference values which are determined in that the differences are formed between the short-time spectral values of the received signals E and the estimated short-time spectral values of the echoes (the components of the vector $X_w(i)$).

The difference spectral vector $D(i)$ is applied to a speech recognition unit 13 as an output parameter of the echo canceller 8. This unit compares patterns of the difference spectral vectors $D(i)$, which are subscriber's speech signals largely freed from echoes, and assigns speech signals to these vectors. This speech recognition in the spectral domain is based upon "PKI Technische Mitteilungen 1/1990, pp. 35 to 41". A function block 14 controls the prompting unit 5 in dependence on the speech signals recognized by the speech recognition sub-system 13, so that send signals S are generated which are used for a continuation or also an interruption of the dialogue with the subscriber.

The echo canceller 8 is instrumental in compensating for the influence of the echoes on the spectral vectors $Y(i)$ by subtraction of the vector $X_w(i)$, so that during a subscriber's speech signal recognition a speech recognition sub-system 13 has an error rate that is sufficiently low for most applications. As against an echo cancellation in the time domain, a 70 to 90% reduction of computational circuitry is obtained with the described arrangement. The spectral analysis means 7, the echo canceller 8 and the buffer memory 6 can be realised without much effort by a single signal processor. The prompting unit 5, the speech recognition sub-system 13 and the function block 14 may be implemented, for example, in a PC (Personal Computer).

The mode of operation of the function blocks 10 and 11 as well as the subtracter device 12 will be further explained with reference to FIG. 2. There is assumed that the spectral analysis means 7 and 9 perform short-time spectral analyses N in length, so that the spectral vector $X(i)$ has N components $X_1(i), X_2(i), \ldots, X_N(i)$, the spectral vector $Y(i)$ has N components $Y_1(i), Y_2(i), \ldots, Y_N(i)$ and the difference spectral vector $D(i)$ also has N components $D_1(i), D_2(i)$ and $D_N(i)$. The vector $X_w(i)$ has N components $w_1(i)*X_1(i), w_2(i)*X_2(i), \ldots, w_N(i)*X_N(i)$ which are formed by multiplier 10a of the function block 10 in that weighting factors $w_1(i), w_2(i), \ldots, w_N(i)$ are respectively multiplied by the components of the spectral vector $X(i)$. The components $D_1(i)$ to $D_N(i)$ of the difference spectral vector $D(i)$ are formed by the differences $Y_1(i)-w_1(i)*X_1(i), \ldots, Y_N(i)-w_N(i)*X_N(i)$. The weighting factors $w_1(i)$ to $w_N(i)$ are set by the function blocks 11a which form the function block 11. Specifically an LMS algorithm (Least Mean Square) can be performed thereby.

An advantageous computation rule for computing the weighting factors reads as follows:

$$w_j(i)=w_j(i-1)+\mu*D_j(i-1)*X_j(i-1), j=1, 2, \ldots, N,$$

where $\mu$ represents here an adaptation constant. If this constant is set to zero, this also means that no adaptation of the weighting factors $w_j(i)$ is made. Instead of the simple multiplication of the components $X_j(i)$ by the weighting factors $w_j(i)$, it is also possible to insert higher-order filters to improve the echo cancellation.

Figure 2:
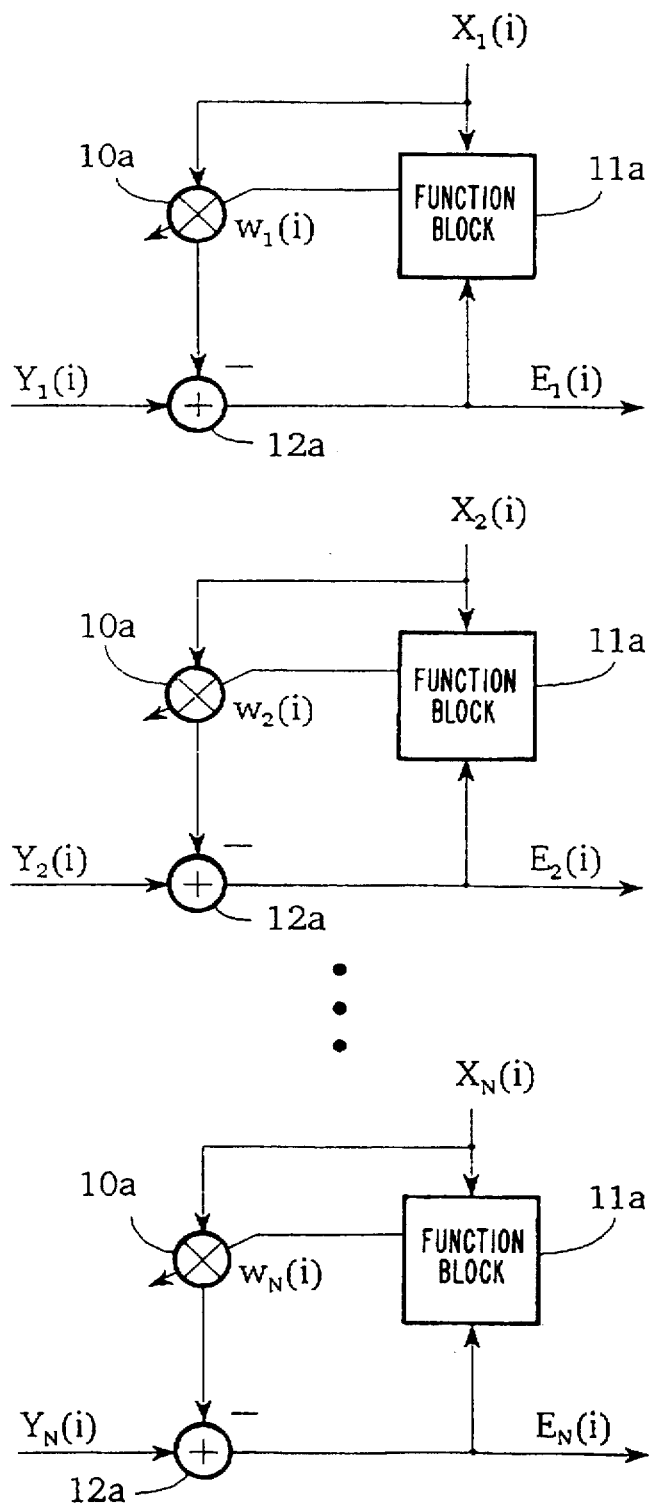
FIG. 2 shows a partial structure of the echo canceller.

The communication arrangement 1 described with respect to FIGS. 1 and 2 can also be used for communicating with a subscriber inside a motor car. For this purpose, the communication arrangement is integrated, for example, with a car radio. In that case the subscriber supplies subscriber's speech signals on the acoustic path to the interface 2 to control the car radio. The prompting unit 5 in that case corresponds to the car radio unit which generates the music signals. The echo canceller 8 is used here for cancelling echoes of the music signals, so that even when music is broadcast, the car radio can be controlled by the subscriber's speech signals.

We claim:
1. An arrangement, comprising:
   signal transmission means for sending transmission signals to a subscriber;
   spectral analysis means for receiving signals including subscriber speech signals generated by the subscriber and having superimposed thereon echoes of the transmission signals, and for producing short-time spectral values of the subscriber speech signals having superimposed thereon the echoes of the transmission signals;

echo cancelling means for estimating short-time spectral values of the echoes and for producing difference values between the short-time spectral values of the received signals and the estimated short-time spectral values of the echoes; and speech recognition means for evaluating the difference values.

2. Arrangement as claimed in claim 1, wherein said echo cancelling means:

produce short-time spectral values of the transmission signals; and adaptively weight the short-time spectral values to estimate the echoes.

3. Arrangement as claimed in claim 2, wherein said echo cancelling means uses an LMS algorithm to adaptively weight the short-time spectral values of the transmission signals.

4. Arrangement as claimed in claim 1, further comprising generating means for generating the transmission signals.

5. Arrangement as claimed in claim 1, wherein the transmission signals are speech announcements.

6. Arrangement as claimed in claim 1; further comprising a telephone network for establishing a communication path between the arrangement and the subscriber.

7. Arrangement as claimed in claim 1, wherein said arrangement is provided for communicating with the subscriber inside a motor vehicle.

8. Arrangement as claimed in claim 7, wherein said arrangement is integrated into a car radio.

9. A communication system comprising:

means for generating send signals;

a spectral analyzer for producing short-time spectral values of received signals, the received signals comprising subscriber speech signals generated by a subscriber and occasionally echoes of the send signals;

echo cancelling means for performing short-time spectral analysis based on the send signals to compensate for reflected echoes of the send signals, and for producing difference signals; and speech recognition means for evaluating the difference values.

* * * * *